March 9, 1965 R. A. BAUDRY 3,172,709
SHAFT BEARING ARRANGEMENT
Filed April 29, 1963 3 Sheets-Sheet 1

WITNESSES
Theodore F. Wrobel
James F. Young

INVENTOR
Rene A. Baudry
BY
Francis S. Blake
ATTORNEY

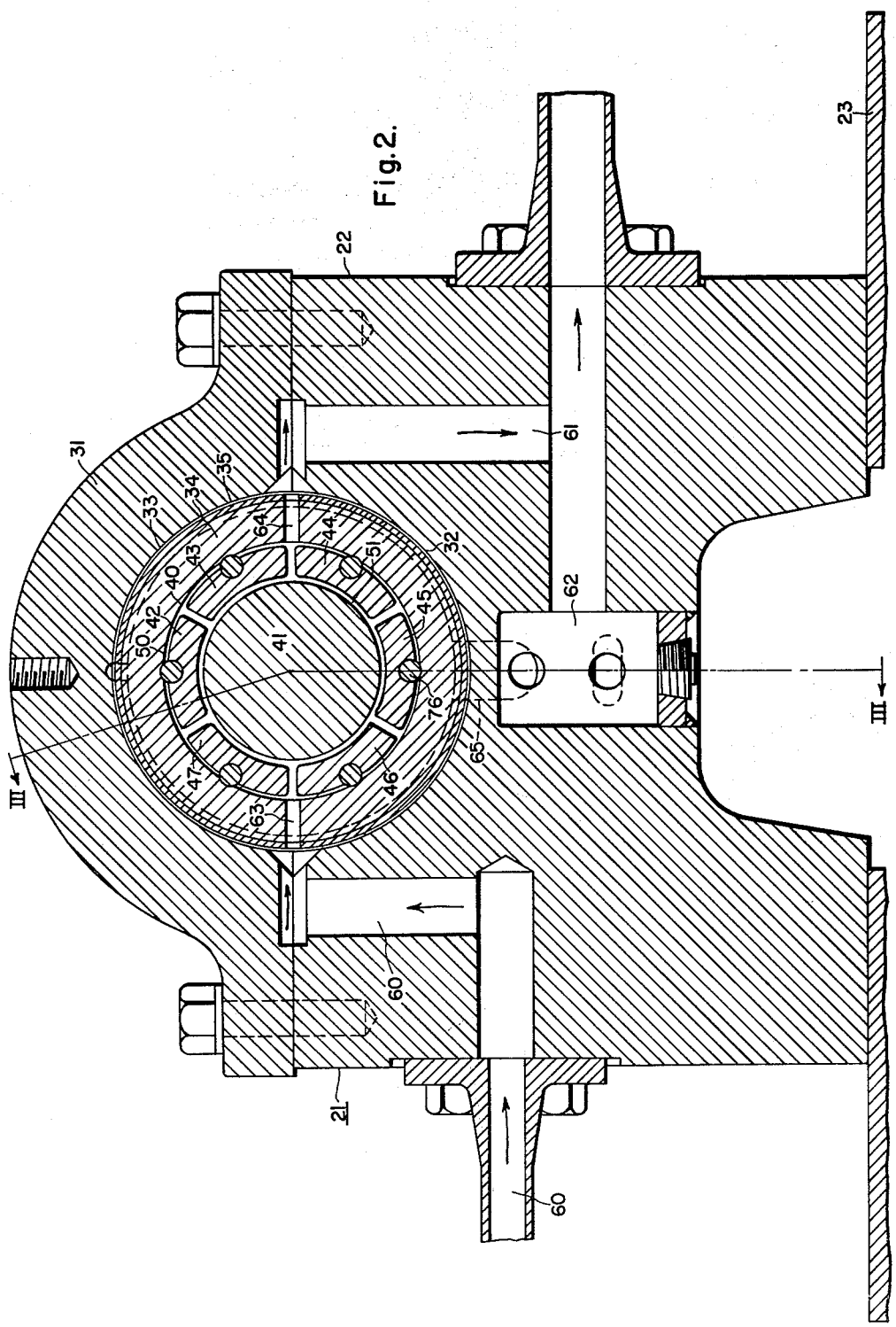

United States Patent Office 3,172,709
Patented Mar. 9, 1965

3,172,709
SHAFT BEARING ARRANGEMENT
Rene A. Baudry, Pittsburgh, Pa., assignor to Westinghouse Electric Corporation, East Pittsburgh, Pa., a corporation of Pennsylvania
Filed Apr. 29, 1963, Ser. No. 276,270
4 Claims. (Cl. 308—9)

The present invention relates to shaft bearing arrangements, and more particularly to shaft bearing structures for rotating apparatus such as large turbine generators.

When large rotating apparatus is provided with a relatively large diameter shaft having a shaft overhang or extension of smaller diameter, and particularly when the shaft extension is itself loaded, the extension may be stabilized against vibration to some extent by providing an outboard journal bearing at or near the end of the shaft extension. However, the provision of an outboard journal bearing for the end of such a shaft extension involves certain problems. For example, the large journal bearings for the large diameter main shaft portions have larger oil film clearances than the smaller diameter outboard bearing, and hence when the shaft is at rest and not rotating, the larger diameter portion of the shaft will settle a greater amount than is permitted by the small oil film clearance of the smaller diameter outboard journal bearing thus resulting in undesirable bending of the shaft in the vicinity of the shaft extension.

The very large electric generators used in electric utility generating plants have exceedingly large diameter and correspondingly heavy rotor shaft portions with relatively large oil clearances for their journal bearings. Such generator shafts are usually provided with an extending collector ring shaft portion of smaller diameter than the main rotor portion of the shaft carrying collector rings for the field winding on the rotor. These shaft extensions with their associated collector ring structures have sometimes been stabilized by a conventional outboard bearing structure having conventional oil film clearance substantially less than the oil film clearances of the journal bearings associated with the main rotor portion of the shaft. As the size and electrical capacity of these large generators have increased, the necessary increase in the exciting current has required longer and heavier collector rings, which has made the use of conventional outboard bearings difficult and unsatisfactory. Thus, relatively large compensations and adjustments for such conditions of operation as bearing misalignment due to slight foundation shifts of the generator relative to the outboard bearing support, differences in thermal expansion, and difference in oil film thickness, as well as adequate damping of vibration in the shaft extension during operation, have not been attainable with the conventional outboard bearing structures but are readily attainable with the use of the damper bearing of the invention.

It is, therefore, a principal object of the present invention to provide an improved shaft bearing arrangement for large diameter shafts having smaller diameter shaft extension.

Another object of the invention is to provide an outboard bearing for a collector ring shaft extension of a generator having a larger diameter rotor shaft portion in an arrangement having damper means to permit optimum damping of the end of the shaft extension while still enabling compensating movements to relieve undesirable bending stresses in the shaft extension due to misalignment of the bearings from any cause.

In accordance with the invention, an outboard damper bearing is provided for a smaller diameter shaft extension of a rotating shaft having a larger diameter main shaft portion supported by one or more main shaft bearings. The outboard bearing assembly has a plurality of bearing and oil film clearances arranged in tandem to thereby provide a total oil film clearance at least as great as the oil film clearance of the main shaft bearing or bearings. Oil or other viscous lubricating medium under pressure is forced to circulate through all of the clearances of the several bearing members to thus enable a limited and damped movement of the shaft extension supported by the outboard damper bearing assembly of the invention to permit some misalignment and to damp vibrations of the shaft.

Further objects, features and attending advantages of the invention will be apparent with reference to the following specification and drawings, in which:

FIG. 2 is a section on the line II—II of the outboard damper bearing structure shown by FIG. 1 on a larger scale;

Figure 1:
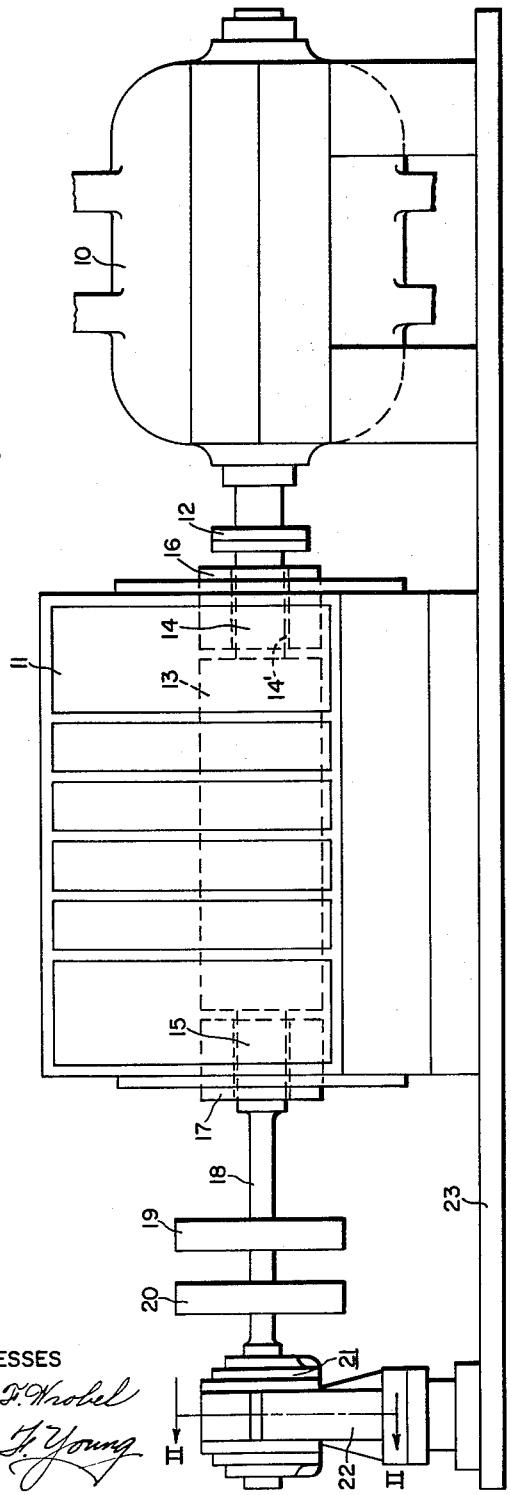
FIG. 1 is a general elevational view of a rotating mechanism embodying the shaft bearing arrangement of the invention.

Referring to FIG. 1 of the drawings, a typical environment for the invention is shown to comprise a prime mover 10 which may be a steam or hydraulic turbine, or other suitable prime mover. An electric generator 11 is coupled to the prime mover 10 by means of the coupling 12 connected to the shaft 13 of the generator rotor. The rotor shaft 13 is provided with large diameter shaft portions 14 and 15 which are journaled in suitable main journal bearings 16 and 17 having conventional oil film clearances 14' and 15'. In addition, the generator rotor shaft 13 is provided with a shaft extension 18 of smaller diameter than the main rotor shaft portions 14 and 15. The smaller diameter shaft extension is adapted to support collector rings 19 and 20, and the outer end of the rotor shaft extension 18 is stabilized by an outboard bearing arrangement generally shown at 21, which is suitably supported on a pedestal structure 22, and which may be mounted on the same foundation 23 that supports the generator 11 and the prime mover 10. The general arrangement of FIG. 1 is slightly exaggerated in order to emphasize the environment of the invention including a large diameter shaft portion supported by main bearings 16 and 17 and an extending smaller diameter shaft portion 18 supported by an outboard bearing 21.

It will be obvious that severe problems due to misalignment of the bearing 21 relative to the bearings 16 and 17 may occur due to shifts in the foundation, differences in thermal expansion, differences in oil film thickness between the large bearings 16 and 17 and the smaller outboard bearing 21, and possibly other causes. It will also be obvious that there will be a tendency to undesirable vibrations of the shaft extension 18 due to the overturning mass and the difficulty of adequately balancing the complete rotor structure with the relatively large and heavy collector rings 19 and 20 on the shaft extension. Furthermore, when the generator 11 is not in operation and the rotor and its shaft 13 are stationary, the oil clearances provided by the main shaft bearings 16 and 17 will normally permit the rotor and shaft to settle vertically a greater distance than the end of the shaft extension 18 is permitted to settle by the smaller oil clearance of a conventional outboard bearing, which would cause undesirable bending of the shaft.

In accordance with the invention, the outboard bearing 21 is modified to provide sufficient damping to keep shaft vibrations at a low amplitude even in the vicinity of critical speeds while permitting sufficient movement of the shaft to compensate for any misalignment that may occur. The arrangement is such that the total oil film clearances in the outboard damper bearing 21 are at least as great as the normal oil clearances in the main bearings 16 and 17, plus expected misalignment, so that the limited motion permitted by such clearances is damped during operation by the viscous nature of the lubricating fluid in the damper bearing arrangement while still enabling the compensating movements for misalignments.

Figure 4:
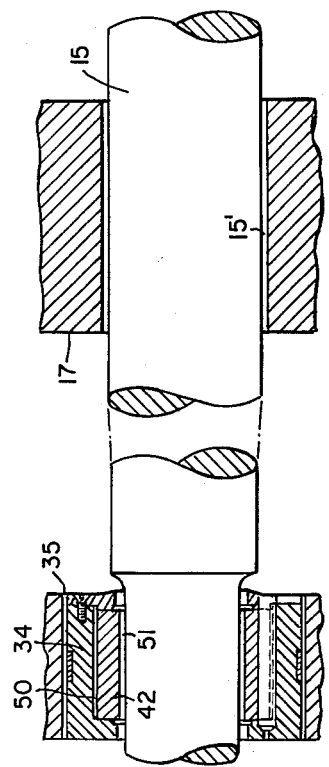
FIG. 4 is a fragmentary vertical sectional view of the axis of the shaft to the left of FIG. 1 showing bearing 17 and a fragmentary vertical sectional view of bearing 22 on line III—III of FIG. 2.
Figure 3:
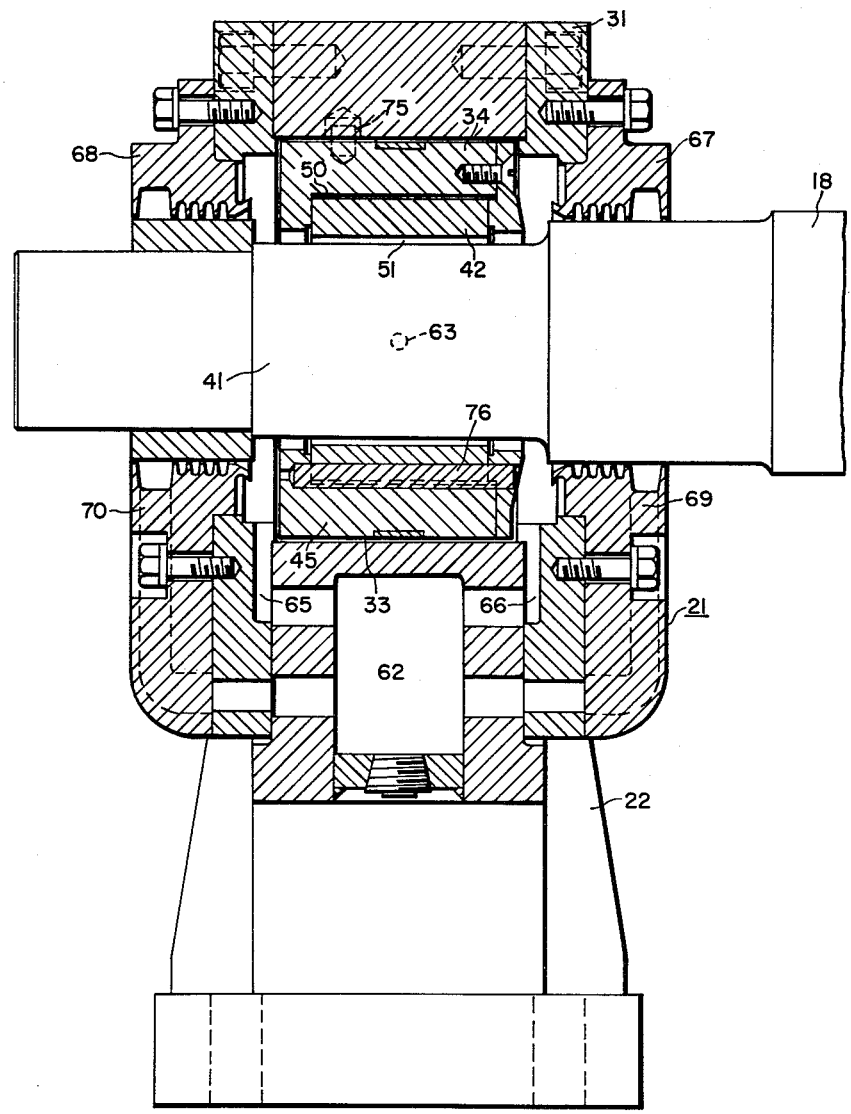
FIG. 3 is a section on the line III—III of FIG. 2.

Referring now to FIGS. 2, 3 and 4 of the drawings, a preferred form of hydraulically damped outboard journal bearing 21 will be described, although it should be understood that the invention is not limited to the specific details of the arrangement shown. A stationary bearing pedestal member 22 is adapted to be supported on the foundation 23 and is provided with an upper bearing cap 31. The pedestal 22 and bearing cap 31 are provided with suitable openings 32 and 33, respectively, in which is placed a first annular ring bearing member 34 having a first predetermined oil film clearance 35 relative to the openings 32 and 33 of the pedestal 22 and bearing 31. Although the openings 32 and 33 and the first bearing member 34 are shown to be circular, it should be understood that other shapes may be used for such openings in the pedestal 22 and cap 31 with the associated bearing member 34 having a correspondingly shaped periphery to maintain the desired first oil clearance space 35 relative to the openings of the pedestal 22 and bearing cap 31 around the entire periphery of the bearing member 34.

The annular ring bearing member 34 is itself provided with an opening or bore 40 arranged to surround the journal portion 41 of the shaft extension 18 but spaced therefrom sufficiently to permit one or more inner bearing members which may be segmental bearing shoes 42–47 to be positioned as shown. The bearing shoes 42–47 are dimensioned to provide a second group of oil clearances between their outer peripheries and the bore 40 of the bearing member 34 such as the one shown at 50. In addition each of the bearing shoes 42–47 is dimensioned to provide a third group of oil clearances between its inner surface and the surface of the journal portion 41 of the shaft extension 18 such as the oil clearance 51. It should be understood that the total clearance provided by the tandem-arranged bearing member 34 and inner bearing members 42–47 is at least equal to, or preferably greater than, the normal oil clearance for the larger diameter of the main journal bearings 16 and 17 shown in FIG. 1. The clearance 51 is relatively small in order to assure that the member 34 is forced to follow the shaft 22 and thus the motion of member 34 relative to the pedestal members 22 and 31 forces oil to move in the clearance 35 to produce the desired damping action.

As previously mentioned, the plurality of tandem-arranged oil clearances for the outboard damper bearing 21, or described in detail in connection with FIGS. 2 and 3 of the drawings, enables a limited movement of the end of the shaft extension 18. In order to damp this movement when the shaft 18 is rotating, to thereby limit the amplitude of any vibration, oil under pressure is admitted through an inlet passage 60 to circulate throughout all of the oil film clearances of the bearing and pass out through the outlets 61 and 62. Two openings, such as openings 63 and 64, admit some of the oil from the inlet 60 to the interior of the bearing ring member 34 and permit the oil on the other side of the ring to escape to the outlet 61. In addition, the oil circulating around the outer oil clearances 35 of the ring bearing member 34 and escaping at the sides and end of the bearing structure is collected through passageways 65 and 66 and escapes to the outlet 62. Conventional labyrinth type oil seals 67 and 68 may also be provided and drain through drains 69 and 70 to the oil outlet 62.

It will be apparent that motion of the shaft 18 will be damped by the viscous fluid flowing in the clearance spaces of the bearing structure. Thus, sufficient movement of the shaft to compensate for any misalignment is permitted but any vibration of the shaft is effectively damped and limited to a very small amplitude even in the neighborhood of the critical speeds of the shaft. Oil is fed into the bearing assembly under pressure to insure that the clearance spaces will always be filled with oil. If this were not done, there would be a possibility that under a condition of relatively large motion of the shaft to compensate for misalignment, the pressure on one side of the shaft would be low enough to permit air dissolved or entrained in the oil to escape and prevent the damping action. The oil pressure is made high enough to prevent this condition but is not high enough to support the damper bearing 34 which is supported by the shaft 18 and follows its movements.

Although a specific arrangement of outboard damper bearing structure has been described, it should be understood that the invention is not limited to the precise shape, arrangement or number of tandem-arranged bearing elements providing the desired total oil film clearance since such number of elements may be increased or decreased and their shapes may differ without departing from the spirit of the invention. For example, the outer bearing member 34 is shown to be pinned at 75 to the stationary bearing cap 31, thus preventing the outer bearing member 34 from rotating. Also, the inner bearing shoes or segments 42–47 are each shown to be supported by axially positioned pins 76 which permit limited tilting of the bearing shoes. If desired, however, the inner and outer bearing members might be permitted to have free rotation relative to the shaft or the bearing pedestal members. Also, the axial pins 76 might be eliminated or replaced by spherical projections permitting universal movement for each bearing shoe. Various other modifications will occur to those skilled in the art.

I claim as my invention:

1. A shaft and bearing arrangement comprising, a shaft having a first large diameter rotating shaft portion and an extending second small diameter shaft portion, at least one main journal bearing member journalling said first large diameter shaft portion with a predetermined main journal oil-film clearance, a stationary bearing pedestal having a pedestal bearing opening therethrough, a pedestal bearing member positioned in said pedestal bearing opening with a first predetermined oil-film clearance relative to said pedestal bearing opening, at least one inner bearing member interposed between said second small diameter shaft portion and the pedestal bearing member, said pedestal bearing member and said inner bearing member being dimensioned to form a second oil-film clearance between said pedestal bearing member and said inner bearing member and a third oil-film clearance between said inner bearing member and said second small diameter shaft portion, and means to feed oil under pressure to said first, second and third oil-film clearances to enable a limited and damped movement of said second shaft portion within said pedestal opening.

2. The invention of claim 1 in which the sum of said first, second and third oil-film clearances is at least equal to said main journal oil-film clearance.

3. A shaft and bearing arrangement comprising, a shaft having a first large diameter rotating shaft portion and an extending second small diameter shaft portion, at least one main journal bearing member journalling said first large diameter shaft portion with a predetermined main journal oil-film clearance, a stationary bearing pedestal having a pedestal bearing opening therethrough, a pedestal bearing annular ring member having an opening therethrough and positioned in said pedestal bearing opening with a first predetermined oil-film clearance relative to said pedestal bearing opening, a plurality of non-rotating inner bearing shoe members interposed in the opening of said annular ring member between said second small diameter shaft portion and the annular ring member, said annular ring member and said inner bearing members being dimensioned to form a second group of oil-film clearances between said pedestal bearing member and said inner bearing members and a third group of oil-film clearances between said inner bearing members and said second small diameter shaft portion, and means to feed oil under pressure to said first oil-film clearance and said second and third groups of oil-film clearances to enable a limited and damped movement of said second shaft portion within said pedestal opening.

4. The invention of claim 3 in which the sum of said first oil-film clearance and said second and third groups of oil-film clearances is at least equal to said main journal oil-film clearance.

References Cited by the Examiner
UNITED STATES PATENTS 2,169,877  8/39  Linn _____ 308—145

FRANK SUSKO, *Primary Examiner.*